United States Patent
Tanaka et al.

(10) Patent No.: US 12,331,734 B2
(45) Date of Patent: Jun. 17, 2025

(54) FLUID CONTROL DEVICE

(71) Applicant: Murata Manufacturing Co., Ltd., Kyoto (JP)

(72) Inventors: Nobuhira Tanaka, Kyoto (JP); Yutoku Kawabata, Kyoto (JP); Hiroki Achiwa, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 18/188,129

(22) Filed: Mar. 22, 2023

(65) Prior Publication Data

US 2023/0220842 A1  Jul. 13, 2023

Related U.S. Application Data

(63) Continuation of application No. PCT/JP2021/029966, filed on Aug. 17, 2021.

(30) Foreign Application Priority Data

Sep. 30, 2020 (JP) .................... 2020-164524

(51) Int. Cl.
*F04B 43/04* (2006.01)
*F16K 27/02* (2006.01)
*F16K 31/00* (2006.01)

(52) U.S. Cl.
CPC ........ *F04B 43/046* (2013.01); *F16K 27/0236* (2013.01); *F16K 31/004* (2013.01)

(58) Field of Classification Search
CPC .... F04B 43/046; F04B 1/145; F04B 27/0891; F16K 27/0236; F16K 31/004; F16K 31/005–007; F16K 99/0048
See application file for complete search history.

(56) References Cited

U.S. PATENT DOCUMENTS

| 4,939,405 A * | 7/1990 | Okuyama ............. F04B 43/046 |
| | | 310/317 |
| 11,695,388 B2 * | 7/2023 | Matsumoto ............. H03H 9/25 |
| | | 310/313 B |
| 11,867,167 B2 * | 1/2024 | Tanaka .................. F04B 45/041 |

(Continued)

FOREIGN PATENT DOCUMENTS

| GB | 2582518 A | 9/2020 |
| JP | H05-019578 U | 3/1993 |

(Continued)

OTHER PUBLICATIONS

International Search Report for PCT/JP2021/029966 dated Sep. 21, 2021.

*Primary Examiner* — Jessica Cahill
(74) *Attorney, Agent, or Firm* — McDonald Hopkins LLC

(57) ABSTRACT

A fluid control device includes a fluid conveying element formed by a pump and a valve, and an outer housing containing the fluid conveying element. The outer housing includes a first outer wall forming an internal space closer to the pump, and a second outer wall forming an internal space closer to the valve. The second outer wall includes an outer-wall main plate having a part overlapping, in plan view, a through hole that is a discharge hole of the valve. A thermal conductivity of the part of the outer-wall main plate overlapping the discharge hole is higher than a thermal conductivity of the first outer wall.

6 Claims, 5 Drawing Sheets

(56) References Cited

U.S. PATENT DOCUMENTS

| | | | | |
|---|---|---|---|---|
| 2002/0184907 A1* | 12/2002 | Vaiyapuri | ............ | H01L 23/467 |
| | | | | 361/689 |
| 2010/0074775 A1* | 3/2010 | Yamamoto | ............ | F04B 43/046 |
| | | | | 417/413.2 |
| 2016/0076537 A1* | 3/2016 | Kawamura | ............... | F16K 7/12 |
| | | | | 137/565.11 |
| 2018/0187672 A1* | 7/2018 | Tanaka | .................... | F04B 45/04 |
| 2018/0223829 A1 | 8/2018 | Tanaka et al. | | |
| 2019/0093772 A1* | 3/2019 | Iizuka | ....................... | F16K 7/17 |
| 2020/0318630 A1* | 10/2020 | Kondo | .................. | F04B 43/046 |
| 2020/0340469 A1* | 10/2020 | Tanaka | ................. | F04B 43/046 |

FOREIGN PATENT DOCUMENTS

| | | |
|---|---|---|
| JP | 2000-265964 A | 9/2000 |
| JP | 2001-182661 A | 7/2001 |
| JP | 2005-229038 A | 8/2005 |
| JP | 2007-198147 A | 8/2007 |
| JP | 2016-200067 A | 12/2016 |
| WO | 2017/038565 A1 | 3/2017 |
| WO | 2019/124060 A1 | 6/2019 |
| WO | WO-2019138676 A1 * | 7/2019 ............ F04B 43/046 |

\* cited by examiner

«FLUID CONTROL DEVICE

CROSS REFERENCE TO RELATED APPLICATION

This is a continuation of International Application No. PCT/JP2021/029966 filed on Aug. 17, 2021 which claims priority from Japanese Patent Application No. 2020-164524 filed on Sep. 30, 2020. The contents of these applications are incorporated herein by reference in their entireties.

BACKGROUND OF THE DISCLOSURE

Field of the Disclosure

The present disclosure relates to a fluid control device including a pump and a housing containing the pump.

Description of the Related Art

Patent Document 1 describes a piezoelectric blower including a pump unit, a valve unit, and an outer housing. The pump unit and the valve unit communicate with each other. A part formed by the pump unit and the valve unit is disposed in the outer housing. A structure formed by the pump unit and the valve unit is fixed to the outer housing.

The structure formed by the pump unit and the valve unit partitions an internal space of the outer housing into a space closer to a pump and a space closer to a valve. The outer housing has a through hole through which the space closer to the pump and an external space communicate with each other, and a through hole through which the space closer to the valve and the external space communicate with each other.

The pump unit includes a piezoelectric element. The pump unit conveys a fluid by application of a drive voltage signal to the piezoelectric element. The valve unit controls the fluid to be conveyed in a predetermined direction.

In this structure, the fluid is suctioned into the pump unit from the outside of the outer housing via the space closer to the pump of the internal space of the outer housing. The fluid discharged from the pump unit is discharged to the outside of the outer housing via the valve unit and the space closer to the valve of the internal space of the outer housing.

Patent Document 1: International Publication No. 2017/038565

BRIEF SUMMARY OF THE DISCLOSURE

However, when the existing structure as described in Patent Document 1 continues to be driven, the temperature of the pump unit (pump chamber) and the temperature of the internal space of the outer housing are increased.

In addition, when a fluid whose temperature is increased by the pump unit flows into the space closer to the valve of the internal space of the outer housing, the temperature of the space closer to the valve is increased. Thus, the temperature difference between the space closer to the valve and the space closer to the pump is increased. Then, the stress generated due to the temperature difference is applied to the outer housing. Thus, for example, the outer housing is likely to be warped.

In this manner, in the existing structure, the piezoelectric element and the pump unit increase in temperature, and the stress generated due to the temperature difference is applied to the outer housing. Thus, the characteristics of a fluid control device are likely to be deteriorated.

Accordingly, a possible benefit of the present disclosure is to provide a fluid control device capable of inhibiting the characteristics from being deteriorated.

A fluid control device of the present disclosure includes: a fluid conveying element; an outer housing containing the fluid conveying element; and a support member with which the fluid conveying element is fixed to the outer housing. The fluid conveying element includes a first flat plate having a suction hole for a fluid, a second flat plate having a discharge hole for the fluid, and a piezoelectric element for conveying the fluid from the suction hole to the discharge hole. The outer housing has a first internal space and a second internal space that are partitioned off by the fluid conveying element and the support member. The outer housing includes a first outer wall forming the first internal space located closer to the first flat plate, the first outer wall having a first through hole through which the first internal space and an external space communicate with each other, and a second outer wall forming the second internal space located closer to the second flat plate, the second outer wall having a second through hole through which the second internal space and the external space communicate with each other. The second outer wall includes a second outer-wall main plate having a main surface facing the second flat plate, and a second side plate connected to the second outer-wall main plate. The second outer-wall main plate has a part overlapping the discharge hole in plan view in a direction orthogonal to the main surface of the second outer-wall main plate. A thermal conductivity of the part of the second outer-wall main plate overlapping the discharge hole is higher than a thermal conductivity of the first outer wall.

With this configuration, the fluid in the second internal space is more likely to dissipate heat than the fluid in the first internal space. Thus, the fluid flowing into the second internal space dissipates the heat, and the difference between the temperature of the fluid flowing into the second internal space and the temperature of the fluid in the first internal space is reduced.

The present disclosure is capable of inhibiting a deterioration in the characteristics of a fluid control device.

DETAILED DESCRIPTION OF THE DISCLOSURE

Embodiment 1

Figure 1:
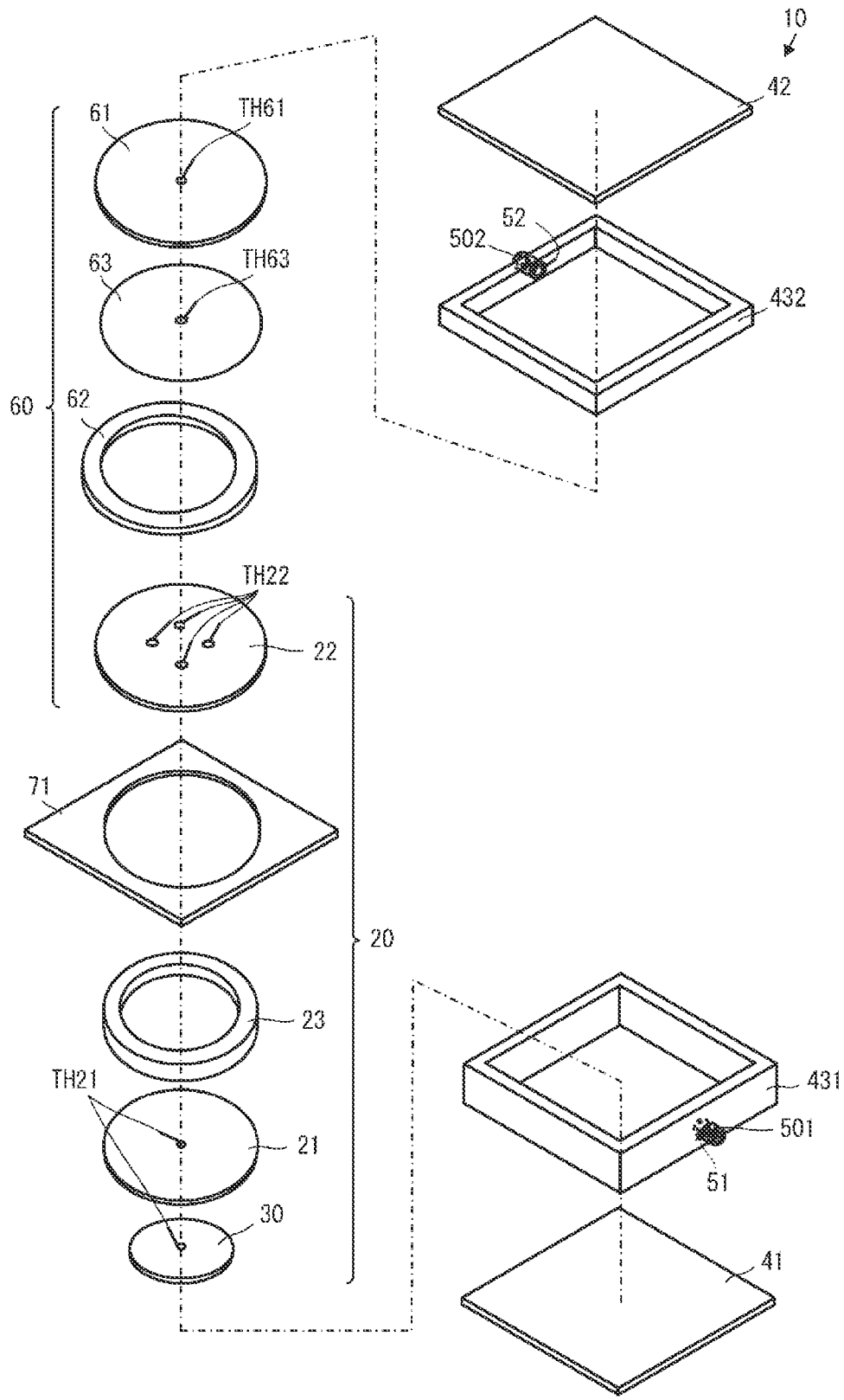
FIG. 1 is an exploded perspective view illustrating an example of the configuration of a fluid control device 10 according to Embodiment 1.
Figure 2A:
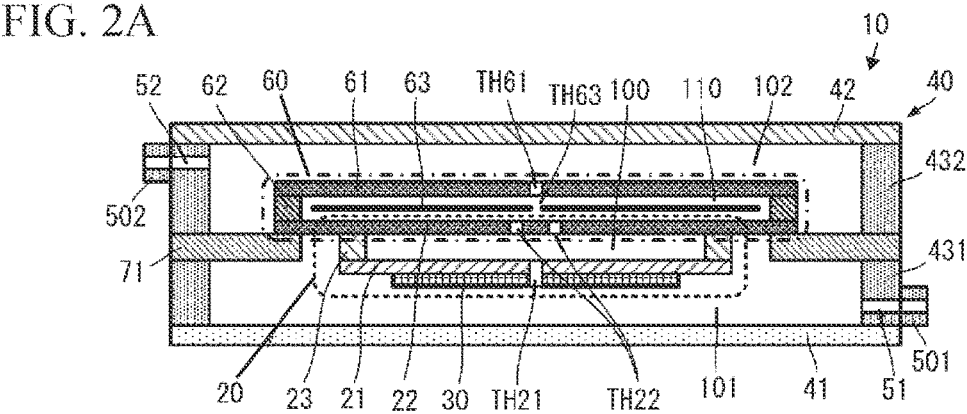
FIG. 2A is a side sectional view illustrating an example of the configuration of the fluid control device 10 according to Embodiment 1.
Figure 2B:
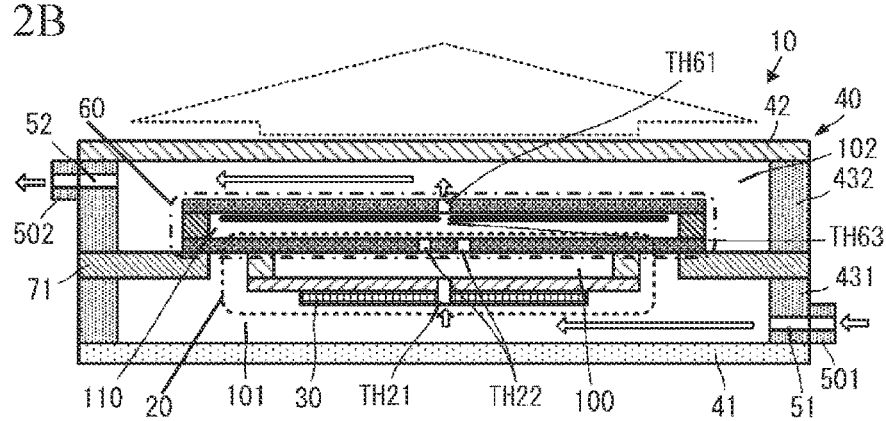
FIG. 2B is a diagram schematically illustrating a state in which the fluid control device 10 according to Embodiment 1 dissipates heat.

A fluid control device according to Embodiment 1 of the present disclosure will be described with reference to the drawings. FIG. 1 is an exploded perspective view illustrating an example of the configuration of a fluid control device 10 according to Embodiment 1. FIG. 2A is a side sectional view illustrating an example of the configuration of the fluid control device 10 according to Embodiment 1, and FIG. 2B is a diagram schematically illustrating a state in which the fluid control device 10 according to Embodiment 1 dissipates heat. In respective drawings of embodiments including the present embodiment, the entire or partial shapes of respective components are illustrated in an exaggerated manner to make the configuration of the fluid control device 10 easy to understand.

As illustrated in FIGS. 1 and 2A, the fluid control device 10 includes a pump 20, an outer housing 40, and a valve 60. Schematically, a fluid conveying element formed by the pump 20 and the valve 60 is contained in the outer housing 40.

(Configuration of Fluid Conveying Element)
(A) Configuration of Pump 20

The pump 20 includes a flat plate 21, a flat plate 22, a pump frame 23, and a piezoelectric element 30.

The flat plate 21 is a circular plate. The flat plate 21 is made of, for example, a metal plate. The flat plate 21 has a through hole TH21. The through hole TH21 has a cylindrical shape and passes through the flat plate 21 in the thickness direction. The through hole TH21 is formed in the vicinity of the center of the flat plate 21.

The piezoelectric element 30 is disposed on one main surface of the flat plate 21. The piezoelectric element 30 is a circular plate. The shape of the piezoelectric element 30 in plan view is smaller than that of the flat plate 21. The center of the piezoelectric element 30 and the center of the flat plate 21 substantially coincide with each other in plan view. For example, the piezoelectric element 30 is realized by a flat piezoelectric body and electrode patterns formed on respective main surfaces of the piezoelectric body. The piezoelectric element 30 has a through hole TH21. The through hole TH21 of the flat plate 21 communicates with the through hole TH21 of the piezoelectric element 30. In other words, the through hole TH21 passes through the piezoelectric element 30 and the flat plate 21 in the thickness direction.

The flat plate 22 is a circular plate. The flat plate 22 is made of a material that is less likely to be bent than that of the flat plate 21. The flat plate 22 has a thickness. The flat plate 22 is disposed on the side where the other main surface of the flat plate 21 is located (the side opposite to the side where the piezoelectric element 30 is disposed). The flat plate 22 is disposed so as to be spaced from the flat plate 21 in a direction orthogonal to the main surfaces (flat surfaces). The main surfaces of the flat plate 22 and the main surfaces of the flat plate 21 are parallel to each other. The area of the flat plate 22 in plan view is larger than the area of the flat plate 21 in plan view. The center of the flat plate 22 and the center of the flat plate 21 substantially coincide with each other in plan view. The flat plate 22 has through holes TH22. The through holes TH22 pass through the flat plate 22 in the thickness direction. A plurality of through holes TH22 are formed in the vicinity of the center of the flat plate 22 in plan view.

The pump frame 23 has a ring shape. The pump frame 23 is disposed between the flat plate 21 and the flat plate 22. The pump frame 23 is joined or adhered to the flat plate 21 and the flat plate 22. Thus, the pump 20 has a pump chamber 100, which is surrounded by the flat plate 21, the flat plate 22, and the pump frame 23.

(B) Configuration of Valve 60

The valve 60 includes the flat plate 22, a flat plate 61, a valve frame 62, and a valve membrane 63. The flat plate 22 has the configuration described above and forms a part of the pump 20.

The flat plate 61 is disposed, on the side opposite to the side where the flat plate 21 is located, so as to be spaced from the flat plate 22. The flat plate 61 faces the flat plate 22. The flat plate 61 has a through hole TH61. The through hole TH61 and the plurality of through holes TH22 do not overlap each other in plan view (when viewed in a direction orthogonal to the main surfaces (flat surfaces) of the flat plate 61 and the flat plate 22).

The valve frame 62 has a ring shape. The valve frame 62 is disposed between the flat plate 22 and the flat plate 61. The valve frame 62 is joined or adhered to the flat plate 22 and the flat plate 61. Thus, the valve 60 has a valve chamber 110, which is surrounded by the flat plate 22, the flat plate 61, and the valve frame 62.

The valve membrane 63 is realized by, for example, a flat plate or a flat membrane shaped so as to be capable of being accommodated in the valve chamber 110. The valve membrane 63 is disposed so as to be capable of moving in the valve chamber 110 in the thickness direction.

The valve membrane 63 has a through hole TH63. In plan view, the through hole TH63 overlaps the through hole TH61 and does not overlap the plurality of through holes TH22.

With this configuration, when a fluid is suctioned through the through hole TH21 of the pump 20, the fluid flows from the pump chamber 100 into the valve chamber 110 through the through holes TH22. The fluid causes the valve membrane 63 to move toward the flat plate 61 and to come into contact with the flat plate 61. In this case, the through hole TH63 overlaps the through hole TH61. Thus, the fluid is discharged from the inside of the valve chamber 110 to the outside of the valve 60 through the through hole TH61.

On the other hand, when a fluid is suctioned backward through the through hole TH61 of the valve 60, the fluid causes the valve membrane 63 to move toward the flat plate 22 and to come into contact with the flat plate 22. In this case, the through hole TH63 does not overlap the through holes TH22. Thus, the fluid does not flow backward into the pump chamber 100.

In this manner, the fluid conveying element formed by the pump 20 and the valve 60 conveys a fluid in one direction. In this configuration, the through hole TH21 of the pump 20 corresponds to a "suction hole of the fluid conveying element" of the present disclosure, and the through hole TH61 of the valve 60 corresponds to a "discharge hole of the fluid conveying element" of the present disclosure. In addition, the flat plate 21 forming the pump 20 corresponds to a "first flat plate" of the present disclosure, and the flat plate 61 forming the valve 60 corresponds to a "second flat plate" of the present disclosure.

A structure formed by the valve 60 and the pump 20 is fixed to the outer housing 40 with a support member 71, which has a flat shape and has an opening at the center thereof.

(Configuration of Outer Housing 40)

The outer housing 40 includes an outer-wall main plate 41, an outer-wall main plate 42, a side plate 431, and a side plate 432.

(Configuration of First Outer Wall)

A first outer wall is formed by the outer-wall main plate 41 and the side plate 431.

The outer-wall main plate 41 is a flat plate having a predetermined shape. For example, in the case of FIGS. 1 and 2A, the outer-wall main plate 41 is a flat plate having a rectangular shape in plan view. The shape of the outer-wall main plate 41 in plan view is larger than the external shape of the fluid conveying element.

The outer-wall main plate 41 is disposed on the side where the one main surface of the flat plate 21 is located (the side where the surface where the piezoelectric element 30 is disposed is located). A flat surface (main surface) of the outer-wall main plate 41 and a flat surface (main surface) of the flat plate 21 are parallel to each other and face each other. The outer-wall main plate 41 is disposed so as to be spaced from the flat plate 21 in the direction orthogonal to the flat surface (main surface) of the flat plate 21. This spaced distance is a distance at which the piezoelectric element 30 and the outer-wall main plate 41 do not come into contact with each other due to the bending vibrations of the flat plate 21 in normal use of the fluid control device 10.

The outer-wall main plate 41 is made of an insulating resin. The outer-wall main plate 41 is not limited to being made of the insulating resin as long as having a lower thermal conductivity than the outer-wall main plate 42.

Here, a thermal conductivity can be defined by the thermal transmission rate and the thermal diffusion rate of an object. A high thermal conductivity means, for example, a high thermal transmission rate and a high thermal diffusion rate. A low thermal conductivity means, for example, a low thermal transmission rate and a low thermal diffusion rate.

The side plate 431 has a predetermined height and has a loop shape. One end of the side plate 431 in the height direction is connected to an outer peripheral end portion of the support member 71. The other end of the side plate 431 in the height direction is connected to an outer peripheral end portion of the outer-wall main plate 41. With this configuration, an internal space 101, which is surrounded by the outer-wall main plate 41, the side plate 431, the fluid conveying element, and the support member 71, is formed on the side of the fluid conveying element where the flat plate 21 of the pump 20 is located.

The side plate 431 has a through hole 51. In addition, a nozzle 501 is disposed on the outside of the part of the side plate 431 where the through hole 51 is formed. An opening of the nozzle 501 communicates with the through hole 51. The nozzle 501 may be formed integrally with the side plate 431 or formed separately from the side plate 431. The internal space 101 communicates with an external space through the through hole 51.

When the side plate 431 is made of an insulating resin, a side plate 431 may be formed integrally with the outer-wall main plate 41.

The outer-wall main plate 41 corresponds to a "first outer-wall main plate" of the present disclosure, and the side plate 431 corresponds to a "first side plate" of the present disclosure. In addition, the internal space 101 corresponds to a "first internal space" of the present disclosure. In addition, the through hole 51 corresponds to a "first through hole" of the present disclosure.

(Configuration of Second Outer Wall)

A second outer wall is formed by the outer-wall main plate 42 and the side plate 432.

The outer-wall main plate 42 is a flat plate having a predetermined shape. For example, in the case of FIGS. 1 and 2A, the outer-wall main plate 42 is a flat plate having a rectangular shape in plan view. The shape of the outer-wall main plate 42 in plan view has substantially the same size as that of the outer-wall main plate 41. The shape of the outer-wall main plate 42 in plan view is substantially the same as that of the outer-wall main plate 41.

The outer-wall main plate 42 is disposed on the side opposite to the side, facing the flat plate 22, of the flat plate 61 of the valve 60. A flat surface (main surface) of the outer-wall main plate 42 and a flat surface (main surface) of the flat plate 61 are parallel to each other and face each other. The outer-wall main plate 42 is disposed so as to be spaced from the flat plate 61 in the direction orthogonal to the flat surface (main surface) of the flat plate 61.

The outer-wall main plate 42 is made of a metal (metal plate). The outer-wall main plate 42 is not limited to being made of the metal (metal plate) as long as having a higher thermal conductivity than the outer-wall main plate 41. In addition, the outer-wall main plate 42 may be selected in consideration of thermal conductivity and rigidity. That is, an example of the outer-wall main plate 42 that has a rigidity required for the fluid control device 10 and has a desired thermal conductivity may be selected.

The side plate 432 has a predetermined height and has a loop shape. One end of the side plate 432 in the height direction is connected to the outer peripheral end portion of the support member 71. The other end of the side plate 432 in the height direction is connected to an outer peripheral end portion of the outer-wall main plate 42. With this configuration, an internal space 102, which is surrounded by the outer-wall main plate 42, the side plate 432, the valve 60, and the support member 71, is formed on the side of the fluid conveying element where the flat plate 61 of the valve 60 is located.

The side plate 432 has a through hole 52. In addition, a nozzle 502 is disposed on the outside of the part of the side plate 432 where the through hole 52 is formed. An opening of the nozzle 502 communicates with the through hole 52. The nozzle 502 may be formed integrally with the side plate 432 or formed separately from the side plate 432. The internal space 102 communicates with the external space through the through hole 52.

The outer-wall main plate 42 corresponds to a "second outer-wall main plate" of the present disclosure, and the side plate 432 corresponds to a "second side plate" of the present disclosure. In addition, the internal space 102 corresponds to a "second internal space" of the present disclosure. In addition, the through hole 52 corresponds to a "second through hole" of the present disclosure.

(Operation of Fluid Control Device 10)

When the fluid control device 10 having the configuration described above conveys a fluid, an AC drive signal is applied to an electrode pattern of the piezoelectric element 30. Thus, the piezoelectric body of the piezoelectric element 30 is warped. Application of the stress generated due to this warpage to the flat plate 21 causes bending vibrations of the flat plate 21. The bending vibrations of the flat plate 21 change the volume of the pump chamber 100 and the pressure in the pump chamber 100.

This pressure change causes the fluid to be successively suctioned from the internal space 101 through the through hole TH21. The fluid in the internal space 101 is supplied from the external space through the through hole 51 and the nozzle 501.

The fluid suctioned into the pump chamber 100 is discharged into the valve chamber 110 through the through holes TH22. The operation of the valve 60 described above causes the fluid in the valve chamber 110 to be discharged into the internal space 102 through the through hole TH63 and the through hole TH61. The fluid in the internal space 102 is discharged to the external space through the through hole 52 and the nozzle 502.

On the other hand, the fluid control device 10 hinders the fluid from being conveyed from the through hole 52 toward the through hole 51 by the operation of the valve 60 described above.

With this configuration, sharp expansion and contraction of air in the pump chamber 100 cause friction between the fluid in the pump chamber 100 and the flat plates 21 and 22, thus increasing the temperature in the pump chamber 100, that is, the temperature of the fluid.

The fluid in the fluid control device 10 is conveyed from the upstream side that is the side of the pump 20 where the piezoelectric element 30 is disposed, to the downstream side that is the side where the valve 60 is located. Accordingly, the fluid having the increased temperature as described above flows into the valve 60 and is discharged to the internal space 102 through the through hole TH61, thus increasing the temperature in the internal space 102.

Here, the outer-wall main plate 42 of the fluid control device 10 is made of a metal. That is, the outer-wall main plate 42 has a high thermal conductivity. Thus, the heat in the internal space 102 is transmitted and diffused in the outer-wall main plate 42 and is transmitted to the surface of the outer-wall main plate 42 closer to the external space. Then, the heat transmitted to the surface of the outer-wall main plate 42 closer to the external space is radiated to the external space. The outer-wall main plate 42 is made of, for example, a SUS. The main material for the outer-wall main plate 42 may be, for example, a SUS. In addition, the outer-wall main plate 42 can be made of, for example, copper. In this case, to achieve sufficient reliability and the like, for example, the outer-wall main plate 42 is more preferably provided with an insulating thin film.

As a result, the fluid control device 10 is capable of effectively dissipating the heat in the internal space 102. Thus, the fluid control device 10 is capable of effectively inhibiting an increase in the temperature in the internal space 102. In addition, this can inhibit an increase in the temperature in the outer housing 40 and thus can inhibit an increase in the temperature of each of the valve 60, the pump 20, and the piezoelectric element 30.

On the other hand, the temperature in the internal space 101, which is located upstream of the piezoelectric element 30 in a fluid flow, is increased due to, for example, the heat radiated from the piezoelectric element 30 but is less likely to increase than the temperature in the internal space 102.

Accordingly, as described above, an increase in the temperature of the side where the internal space 102 is located is inhibited, thus reducing the temperature difference between the internal space 101 and the internal space 102.

Figure 3:
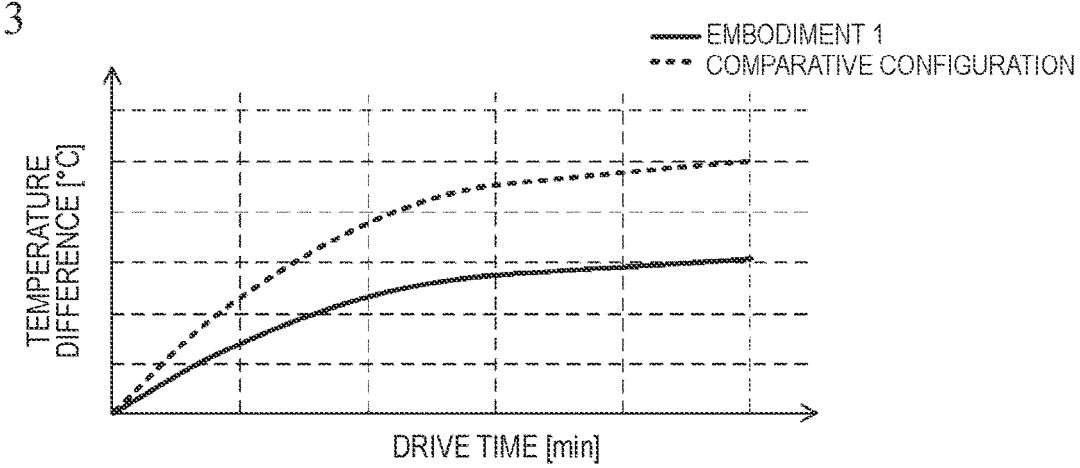
FIG. 3 is a graph illustrating changes over time in the temperature differences between internal spaces closer to piezoelectric elements of a fluid control device having a comparative configuration and the fluid control device 10 having the configuration according to Embodiment 1 of the present disclosure.

FIG. 3 is a graph illustrating changes over time in the temperature differences between internal spaces closer to piezoelectric elements of a fluid control device having a comparative configuration and the fluid control device 10 having the configuration according to Embodiment 1 of the present disclosure. FIG. 3 illustrates a change in the temperature difference between the internal space 101 and the internal space 102 when the piezoelectric element 30 continues to be driven at 1 W in an environment at 25° C. In the comparative configuration, the entire outer housing is made of a metal. That is, both the outer-wall main plate 41 and the outer-wall main plate 42 of the present disclosure are made of a metal.

As illustrated in FIG. 3, the use of the configuration of the present embodiment enables a reduction in the temperature difference between the internal space 101 and the internal space 102, that is, the temperature difference between the upstream side and the downstream side of the pump 20 in the outer housing 40. Then, as illustrated in FIG. 3, the effect of reducing the temperature difference can be achieved in any of a transition period in which each temperature is increased from the beginning of driving and a steady period in which the driving state is stable.

Thus, the fluid control device 10 is capable of inhibiting an increase in the temperature of each of the pump 20 and the piezoelectric element 30 and a deterioration in characteristics due to the warpage of the outer housing. In addition, the fluid control device 10 is capable of inhibiting a reduction in the reliability of the outer housing due to the warpage of the outer housing, thus enabling an extension of the product life, for example.

In addition, in the fluid control device 10, the entire outer-wall main plate 42 is made of a metal. This improves the effect of dissipating the heat in the internal space 102, thus further reducing the temperature difference between the internal space 101 and the internal space 102.

In addition, in the fluid control device 10, the side plate 432 has the through hole 52, through which the internal space 102 communicates with the external space. Thus, the fluid discharged through the through hole TH61 comes into contact with the surface of the outer-wall main plate 42 closer to the internal space 102 and is conveyed to the through hole 52 along this surface. Accordingly, the heat is more effectively conveyed from the fluid to the outer-wall main plate 42. Thus, the fluid control device 10 is capable of more effectively reducing the temperature difference between the internal space 101 and the internal space 102.

Embodiment 2

Figure 4:
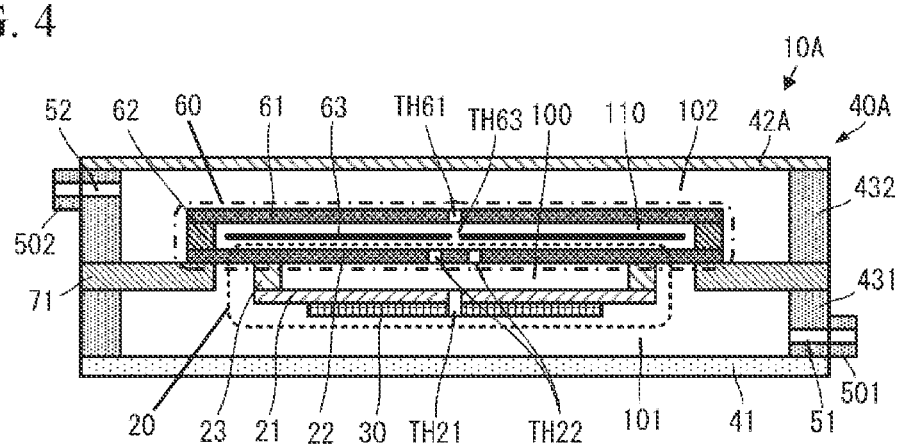
FIG. 4 is a side sectional view illustrating an example of the configuration of a fluid control device 10A according to Embodiment 2.

A fluid control device according to Embodiment 2 of the present disclosure will be described with reference to the drawing. FIG. 4 is a side sectional view illustrating an example of the configuration of a fluid control device 10A according to Embodiment 2.

As illustrated in FIG. 4, the fluid control device 10A according to Embodiment 2 differs from the fluid control device 10 according to Embodiment 1 in an outer-wall main plate 42A of an outer housing 40A. The other configurations of the fluid control device 10A are similar to those of the fluid control device 10, and descriptions of similar parts are omitted.

The fluid control device 10A includes the outer housing 40A. The outer housing 40A includes the outer-wall main plate 42A. The outer-wall main plate 42A is thinner than the outer-wall main plate 41. More specifically, the part of the outer-wall main plate 42A facing the through hole TH61 is thinner than the outer-wall main plate 41 (in particular, the part thereof facing the piezoelectric element 30).

Thus, the thermal resistance of the outer-wall main plate 42A is controlled to be low. In addition, the fluid control device 10A is capable of further improving the dissipation of the heat in the internal space 102 (discharge of heat to the external space) and is thus capable of more effectively reducing the temperature difference. Accordingly, the fluid control device 10A is capable of more effectively inhibiting a deterioration in characteristics.

In addition, the outer-wall main plate 42A, which has a higher specific gravity than the outer-wall main plate 41, is thin. Thus, the fluid control device 10A can be reduced in weight.

In this case, a rigidity that fulfills reliability specifications for the fluid control device 10A can be maintained by appropriately setting the thickness of the outer-wall main plate 42A. That is, the fluid control device 10A can be reduced in weight while having desired reliability.

Embodiment 3

Figure 5:
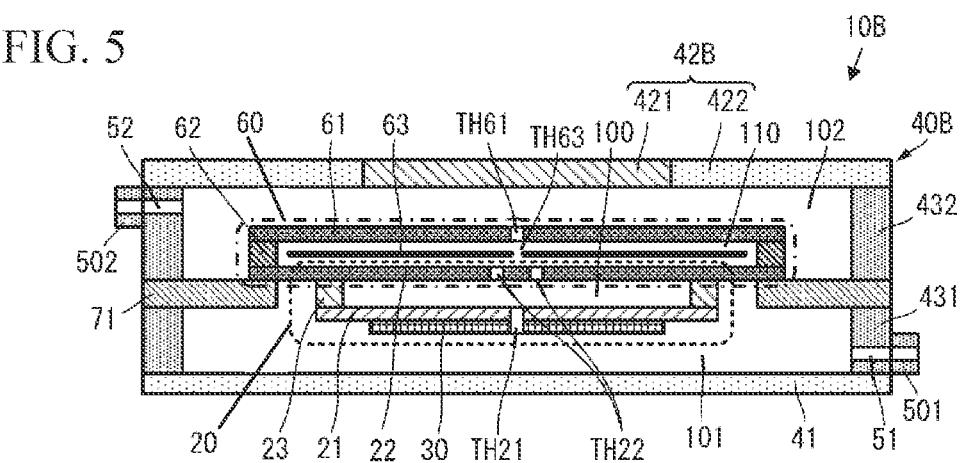
FIG. 5 is a side sectional view illustrating an example of the configuration of a fluid control device 10B according to Embodiment 3.

A fluid control device according to Embodiment 3 of the present disclosure will be described with reference to the drawing. FIG. 5 is a side sectional view illustrating an example of the configuration of a fluid control device 10B according to Embodiment 3.

As illustrated in FIG. 5, the fluid control device 10B according to Embodiment 3 differs from the fluid control device 10 according to Embodiment 1 in an outer-wall main plate 42B of an outer housing 40B. The other configurations of the fluid control device 10B are similar to those of the fluid control device 10, and descriptions of similar parts are omitted.

The outer-wall main plate 42B includes a metal portion 421 and a resin portion 422. The resin portion 422 is disposed so as to surround the outer periphery of the metal portion 421.

The metal portion 421 has, for example, a circular plate shape. The area of the metal portion 421 in plan view is equal to or larger than the area of the through hole TH61 in plan view. The metal portion 421 overlaps the through hole TH61 in plan view.

In this configuration, the part with which the fluid discharged through the through hole TH61 comes into contact is the metal portion 421. Thus, the fluid control device 10B is capable of achieving the effect of dissipating the heat in the side where the above described internal space 102 is located. Accordingly, the fluid control device 10B is capable of reducing the temperature difference between the internal space 101 and the internal space 102 and is thus capable of inhibiting a deterioration in characteristics.

In addition, the metal portion 421 can be thinner than the resin portion 422. With this configuration, the fluid control device 10B is capable of more effectively dissipating the heat in the internal space 102.

Embodiment 4

Figure 6A:
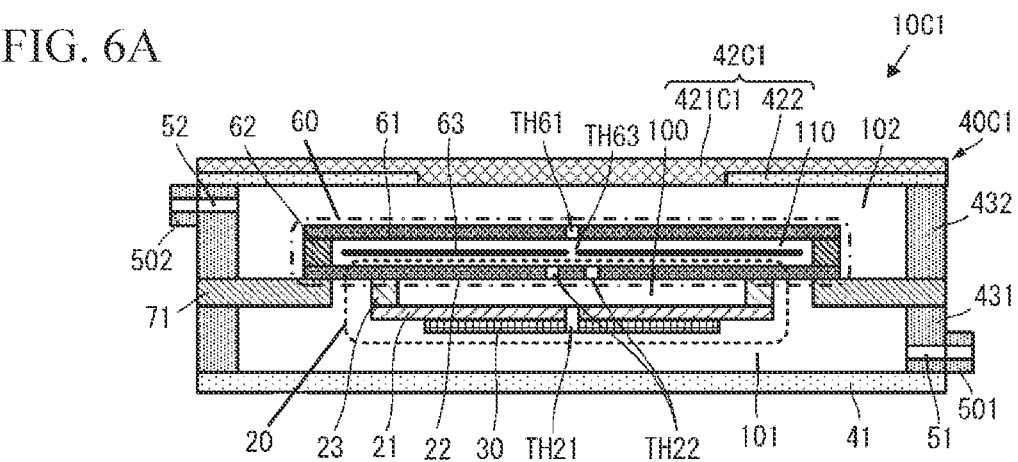
FIGS. 6A and 6B are side sectional views illustrating examples of the configurations of fluid control devices 10C1 and 10C2 according to Embodiment 4.
Figure 6B:
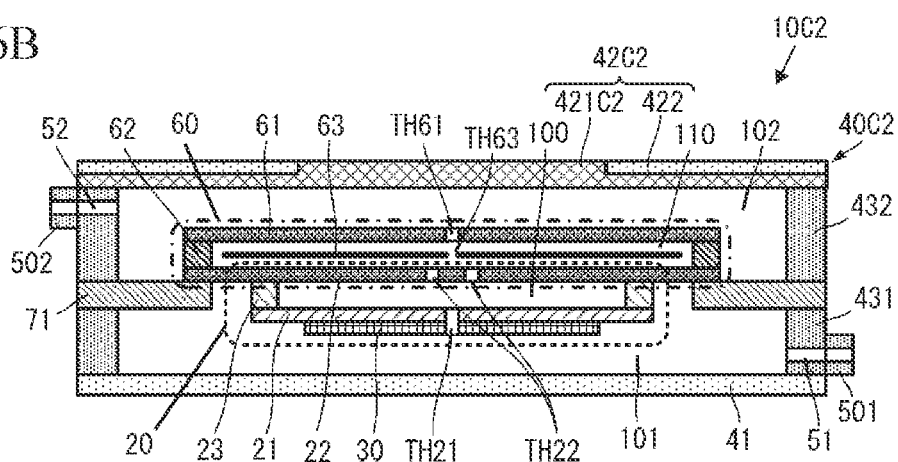

Fluid control devices according to Embodiment 4 of the present disclosure will be described with reference to the drawings. FIG. 6A is a side sectional view illustrating an example of the configuration of a fluid control device 10C1 according to Embodiment 4. FIG. 6B is a side sectional view illustrating an example of the configuration of a fluid control device 10C2 according to Embodiment 4.

As illustrated in FIGS. 6A and 6B, the fluid control devices 10C1 and 10C2 according to Embodiment 4 differ from the fluid control device 10 according to Embodiment 1 in an outer-wall main plate 42C1 of an outer housing 40C1 and an outer-wall main plate 42C2 of an outer housing 40C2. The other configurations of the fluid control devices 10C1 and 10C2 are similar to those of the fluid control device 10, and descriptions of similar parts are omitted.

As illustrated in FIG. 6A, the outer-wall main plate 42C1 of the fluid control device 10C1 includes a metal portion 421C1 and the resin portion 422.

The metal portion 421C1 has two regions having different thicknesses. More specifically, the metal portion 421C1 has a thick central region and a thin peripheral region. The shape of the central region in plan view is a shape (for example, a circular shape) whose area is larger than the area of the through hole TH61 in plan view. The peripheral region has a shape surrounding the outer periphery of the central region. The external shape of the peripheral region is substantially the same as the shape of the outer-wall main plate 41 in plan view. The part, located in the central region, of one main surface of the metal portion 421C1 is flush with the part, located in the peripheral region, of the one main surface of the metal portion 421C1. The other main surface of the metal portion 421C1 has a shape in which the peripheral region is recessed from the central region.

The resin portion 422 is a flat plate having an opening at the center thereof. The resin portion 422 is disposed on the part of the peripheral region located at the other main surface of the metal portion 421C1. In other words, the resin portion 422 is disposed so as to fill the recess located at the other main surface of the metal portion 421C1. Thus, both main surfaces of the outer-wall main plate 42C1 are flat.

The outer-wall main plate 42C1 is disposed such that the other main surface of the metal portion 421C1 faces the valve 60. In this case, the central portion of the metal portion 421C1 is disposed so as to overlap the through hole TH61.

With this configuration, the fluid control device 10C1 is capable of effectively dissipating the heat in the internal space 102. In addition, the outer-wall main plate 42C1 can be reduced in weight compared with a case in which the entire outer-wall main plate 42C1 is made of a metal.

As illustrated in FIG. 6B, the outer-wall main plate 42C2 of the fluid control device 10C2 includes a metal portion 421C2 and the resin portion 422.

The metal portion 421C2 has the same shape as the metal portion 421C1. The outer-wall main plate 42C2 is disposed such that the other main surface of the metal portion 421C2 is exposed to the external space. That is, the outer-wall main plate 42C2 is disposed such that the surface thereof made entirely of a metal is located closer to the internal space 102.

With this configuration, the fluid control device 10C2 is capable of effectively dissipating the heat in the internal space 102. In addition, the outer-wall main plate 42C2 can be reduced in weight compared with a case in which the entire outer-wall main plate 42C2 is made of a metal.

Embodiment 5

Figure 7:
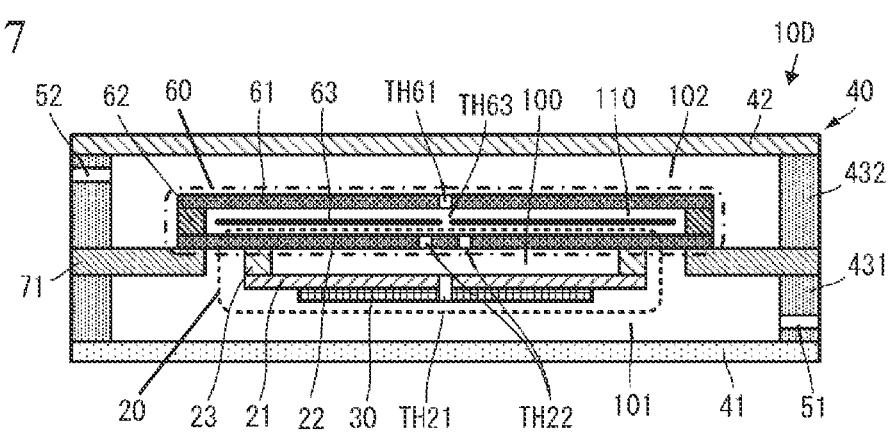
FIG. 7 is a side sectional view illustrating an example of the configuration of a fluid control device 10D according to Embodiment 5.

A fluid control device according to Embodiment 5 of the present disclosure will be described with reference to the drawing. FIG. 7 is a side sectional view illustrating an example of the configuration of a fluid control device 10D according to Embodiment 5.

As illustrated in FIG. 7, the fluid control device 10D according to Embodiment 5 differs from the fluid control device 10 according to Embodiment 1 in that the nozzles 501 and 502 are omitted. The other configurations of the fluid control device 10D are similar to those of the fluid control device 10, and descriptions of similar parts are omitted.

The fluid control device 10D does not include the nozzles 501 and 502. Even with this configuration, the fluid control device 10D is capable of reducing the temperature difference between the internal space 101 and the internal space 102.

Embodiment 6

Figure 8:
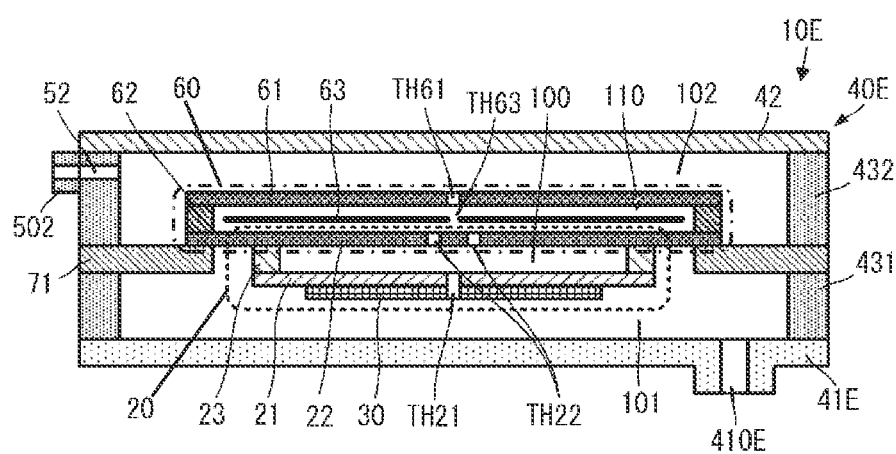
FIG. 8 is a side sectional view illustrating an example of the configuration of a fluid control device 10E according to Embodiment 6.

A fluid control device according to Embodiment 6 of the present disclosure will be described with reference to the drawing. FIG. 8 is a side sectional view illustrating an example of the configuration of a fluid control device 10E according to Embodiment 6.

As illustrated in FIG. 8, the fluid control device 10E according to Embodiment 6 differs from the fluid control device 10 according to Embodiment 1 in a configuration in which a through hole 410E, through which the internal space 101 communicates with the external space, is formed. The other configurations of the fluid control device 10E are similar to those of the fluid control device 10, and descriptions of similar parts are omitted.

The fluid control device 10E includes an outer housing 40E, which includes an outer-wall main plate 41E. The outer-wall main plate 41E has the through hole 410E.

Even with this configuration, the fluid control device 10E is capable of reducing the temperature difference between the internal space 101 and the internal space 102.

Each embodiment described above illustrates a configuration in which a metal part is made of a sheet of metal. However, such a metal part may be formed by laminating a plurality of sheets of metal. Alternatively, such a metal part may be formed by laminating, on a thin insulating core material, a metal thicker than the core material. That is, in each embodiment described above, it is sufficient that the thermal conductivity of the outer-wall main plate closer to the internal space 102 be higher than the thermal conductivity of the outer-wall main plate closer to the internal space 101. In other words, it is sufficient that the thermal conductivity of a part of the outer housing located downstream of the piezoelectric element 30 in a fluid flow be higher than the thermal conductivity of a part of the outer housing located upstream of the piezoelectric element 30 in a fluid flow.

In addition, the configurations of the embodiments described above can be combined as appropriate. It is possible to achieve functions and effects according to respective combinations.

10, 10A, 10B, 10C1, 10C2, 10D, 10E fluid control device
20 pump
21, 22 flat plate
23 pump frame
30 piezoelectric element
40, 40A, 40B, 40C1, 40C2, 40E outer housing
41, 41E, 42, 42A, 42B, 42C1, 42C2 outer-wall main plate
51, 52 through hole
60 valve
61 flat plate
62 valve frame
63 valve membrane
71 support member
100 pump chamber
101, 102 internal space
110 valve chamber
410E through hole
421, 421C1, 421C2 metal portion
422 resin portion
431, 432 side plate
501, 502 nozzle
TH21 through hole
TH22 through hole
TH61 through hole
TH63 through hole

The invention claimed is:

1. A fluid control device comprising:
a fluid conveying element;
an outer housing containing the fluid conveying element; and
a support member with which the fluid conveying element is fixed to the outer housing,
wherein the fluid conveying element includes:
a first flat plate having a suction hole for a fluid,
a second flat plate having a discharge hole for the fluid, and
a piezoelectric element,
wherein the outer housing has a first internal space and a second internal space, the first internal space and the second internal space being partitioned off by the fluid conveying element and the support member,
wherein the outer housing includes:
a first outer wall forming the first internal space located closer to the first flat plate than the second flat plate, the first outer wall having a first through hole through which the first internal space and an external space communicate with each other, and
a second outer wall forming the second internal space located closer to the second flat plate than the first flat plate, the second outer wall having a second through hole through which the second internal space and the external space communicate with each other,
wherein the second outer wall includes:
a second outer-wall main plate having a main surface facing the second flat plate, and
a second side plate connected to the second outer-wall main plate, wherein the second outer-wall main plate has a part overlapping the discharge hole in plan view in a direction orthogonal to the main surface of the second outer-wall main plate,
wherein a thermal conductivity of the part of the second outer-wall main plate overlapping the discharge hole is higher than a thermal conductivity of the first outer wall,
wherein the second outer-wall main plate comprises a metal portion and a resin portion, and
wherein the metal portion is thinner than the resin portion.

2. The fluid control device according to claim 1, wherein the first outer wall is comprised of a resin, and
a surface, facing the second internal space, of the part of the second outer-wall main plate overlapping the discharge hole in the plan view in the direction orthogonal to the main surface of the second outer-wall main plate is the metal portion.

3. The fluid control device according to claim 2, wherein the part of the second outer-wall main plate overlapping the discharge hole is the metal portion.

4. The fluid control device according to claim 3, wherein the second side plate has the second through hole.

5. The fluid control device according to claim 2, wherein the second side plate has the second through hole.

6. The fluid control device according to claim 1, wherein the second side plate has the second through hole.

* * * * *